Patented Apr. 2, 1946

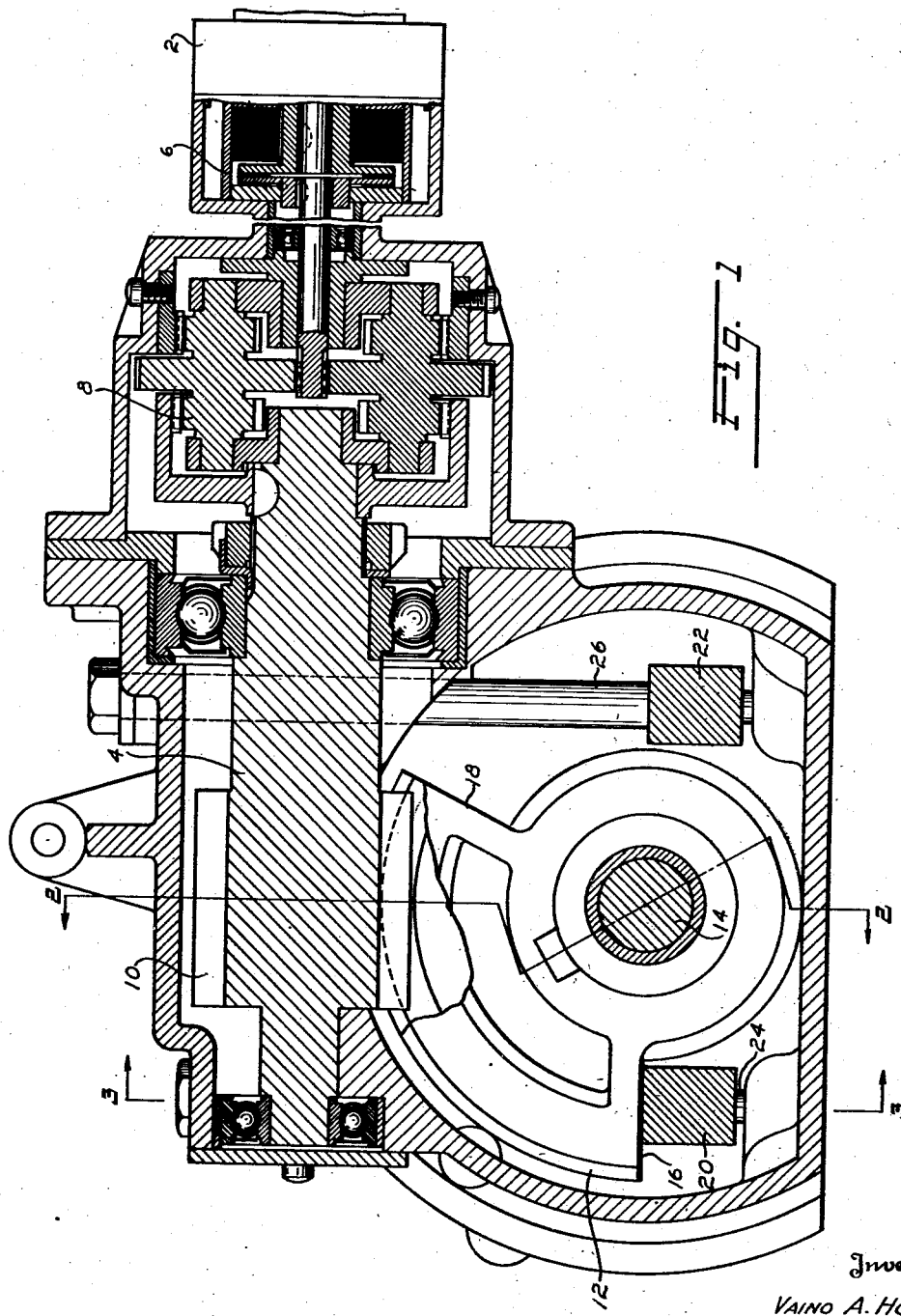

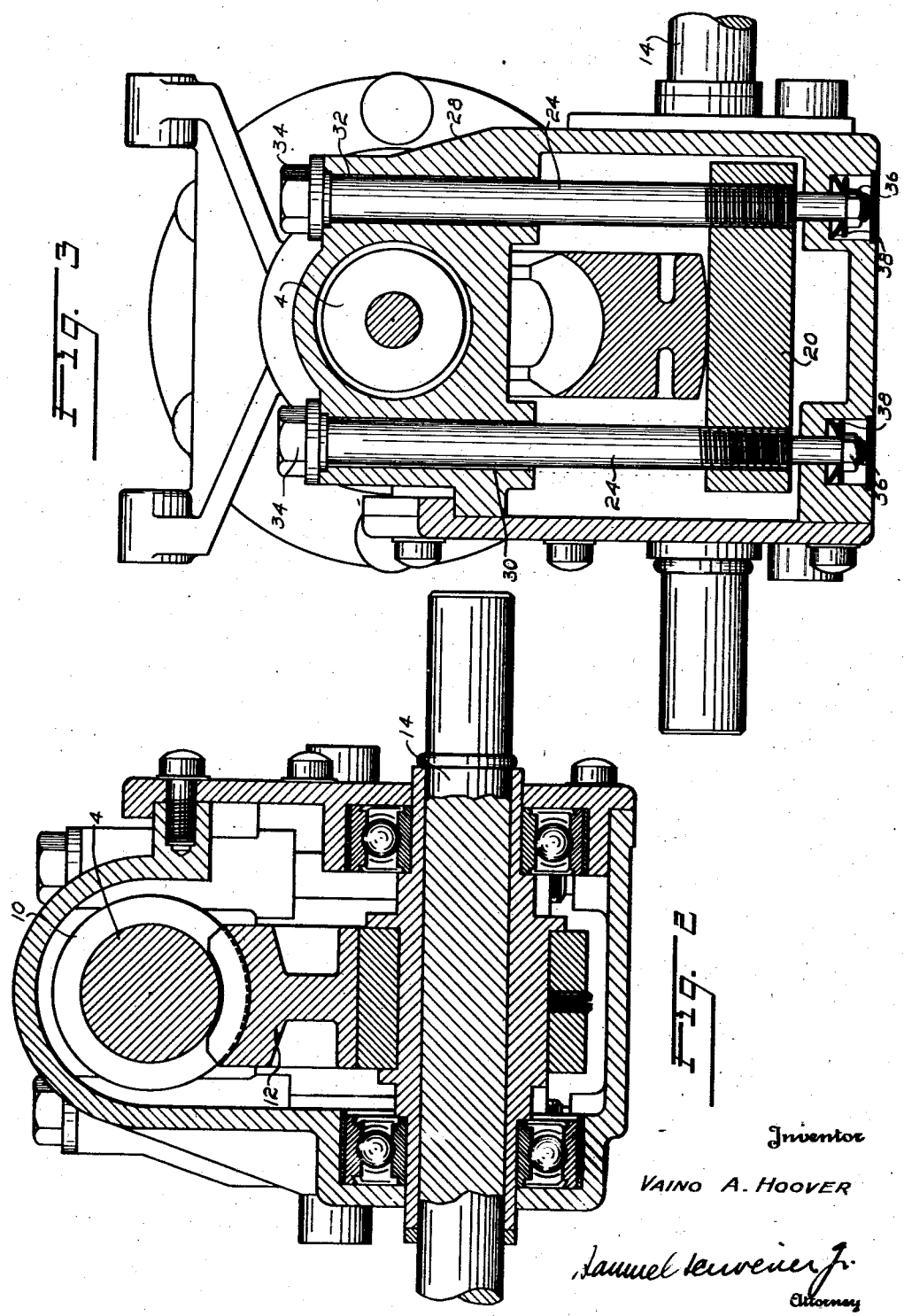

2,397,861

UNITED STATES PATENT OFFICE 2,397,861

STOP MEANS FOR ROTATING SHAFTS

Vaino A. Hoover, Los Angeles, Calif., assignor to Electrical Engineering and Manufacturing Corporation, Los Angeles, Calif., a corporation of California Application November 6, 1943, Serial No. 509,293

6 Claims. (Cl. 192—.02)

This invention relates to systems in which a shaft is rotated under very high torque and it is required to stop the rotation of the shaft at a definite point. It is usual, in those of such systems which employ an electric motor as a driving means for the shaft, to provide limit switch means for de-energizing the motor when the shaft has rotated through the required angle. However, in certain applications and uses of such systems it is not possible to rely entirely on the operation of such limit switches or on the mere de-energization of the driving motor, and positive means must be provided for stopping the rotation of the shaft. It has been found, however, that in the uses and applications wherein this invention is chiefly useful known stop means have not been capable of stopping the shaft because of the very high torques employed. Thus, in oil cooler door systems for aircraft, in which a door must be opened against the force of the slipstream, usual stop means are useless, as the pressures developed against the stop means are useless, as the pressures developed against the stop means by the rotating shaft in the event of failure of the limit switch means is so great that failure of the stop means or the supporting housing usually occurs.

It is therefore the principal object of the invention to provide new and useful stop means for a shaft developing a very high torque, which means will utilize the maximum strength of all parts of the assembly embodying such means, including the maximum strength of the means attaching the stop means to the casing. It is a further object of the invention to provide, in a system of the character described and in connection with the stop means of the invention, means for transmitting the driving force to the shaft which will be operable to discontinue the driving force, upon stopping of the shaft without de-energization of the driving motor.

Other objects and features of novelty of the invention will be made apparent by the following description and the annexed drawings which, it will be understood, are only illustrative of the invention and impose no limitation thereon not imposed by the appended claims.

Referring to the drawings, in which similar reference numerals refer to like parts, Fig. 1 is a view, partly in section, of a device embodying stop means according to the invention, and Figs. 2 and 3 are, respectively, sectional views taken on the lines 2—2 and 3—3 of Fig. 1.

In Fig. 1 of the drawings there is illustrated a drive for an aircraft engine oil cooler door, with which device my invention may be associated and is particularly useful. This device comprises an electric motor 2 which drives a shaft 4 through an electromagnetic clutch 6 and reduction gearing 8, through which the shaft 4 is rotated at a very low speed. The shaft is provided with worm 10 which meshes with a worm gear wheel 12 which is keyed to a shaft 14 which operates a device (not shown), such as the door of an aircraft oil cooler, and also operates a limit switch device (not shown) by which the motor 2 is de-energized upon rotation of the shaft 14 through a pre-determined arc.

Means are provided by the invention for positively stopping shaft 14 upon rotation thereof through a pre-determined arc, which means will be effective to stop such rotation even through the driving motor continues to rotate because of failure of the limit switch control. According to the invention the worm gear wheel 12 extends through only part of a full circle, being illustrated as being approximately 120° in arcuate extent, and therefore provides abutment faces 16, 18 at the opposite ends thereof. Stop means are provided by the invention for engaging these faces and comprise elongated metallic blocks 20, 22 which are preferably positioned parallel to the shaft 14 and, respectively, within the paths of movement of the faces 16, 18 as the worm gear wheel is rotated by the shaft 14. Both ends of each of the blocks 20, 22 are tapped to receive the screw-threaded lower ends of elongated bolts 24, 24 and 26, 26 which extend from the top to the bottom of the housing 28 within which the described parts are enclosed and the un-threaded upper parts of which bolts pass freely through openings 30, 32 in the upper part of the housing. The wall of the housing through which the upper parts of the bolts 24, 26 pass is of considerable and substantial thickness in the direction of the bolts, as shown in Fig. 3 and such enlarged part surrounds the shaft 4. The bolts pass through this thick part and those of each pair are disposed on opposite sides of the shaft 4, whereby the thickened part of the housing forms an elongated saddle extending between the bolts of each pair, which aids materially in supporting the load. Such enlarged or thickened part of the housing is preferably disposed on the opposite side of shaft 14 from the stop blocks, thereby permitting the use of bolts of maximum length. The bolts are provided with heads 34 at their upper ends which prevent their downward movement through the holes 30, 32 in the housing, and their lower ends are reduced and pass through openings in the lower wall of housing 28 to receive nuts 36, between which and the housing are provided spring washers 38 which constantly urge the bolts downwardly.

In the operation of the described device, rotation of shaft 4 will be transmitted to shaft 14 through worm 10 and worm gear 12. Upon rotation of the shaft 14 through a pre-determined arc in a counter-clockwise direction as viewed in Fig. 1, the face 16 of the worm gear wheel will contact the upper face of block 20. Further rotation of shaft 14 and the gear wheel, which will tend to occur if the limit switch control means fails, will be prevented by block 20. It will be seen that such further movement of the shaft will be resisted by the bending strength of block 20, the tensional strength of the bolts 24, and the compressive strength of the thickened part of the housing 28 through which the bolts extend. There is thus provided a stop means which will be sure and positive, regardless of the magnitude of the torque exerted by shaft 14. It will be apparent that block 22, its supporting bolts 26, and the housing 28 will prevent rotation of shaft 14 in a clockwise direction as viewed in Fig. 1 in the same manner as described herein for stopping rotation in a counter-clockwise direction.

The magnetic clutch 6 assists the stop means in absorbing the pressure of shaft 14 in the event of failure of the limit switch control. Upon engagement of the worm gear with one of the stop blocks, and in the event that the motor continues to operate because of failure of the limit switch, the magnetic clutch will momentarily slip. The torque developed by the clutch will eventually stop the motor, which is as is usual provided with protective means which will de-energize the motor if it remains in a locked-rotor condition. The skidding of the clutch parts on each other will also absorb some of the shock which would otherwise be transmitted to the stop block.

The bolts 24, 26 not only absorb the shock transmitted to the stop block by elongating, but also transmit such shock to the housing. In addition they provide means for adjusting the position of the blocks with respect to the faces of the abutment.

While I have described and illustrated one embodiment of my invention it will be apparent to those skilled in the art that other embodiments may be made, as well as modifications of that disclosed, without departing in any way from the spirit or scope of the invention, for the limits of which reference must be had to the appended claims.

I claim:

1. A stop device for a rotating shaft, comprising an abutment carried by the shaft, a block disposed within the path of movement of said abutment, a housing enclosing said parts, a plurality of elongated means attaching said block to said housing and passing freely through said housing, and means maintaining the spaced relation of said block to said housing.

2. A stop device for a rotating shaft, comprising an abutment drivably connected to the shaft, a stop block disposed in the path of movement of said abutment at one side of and spaced from the shaft, a housing enclosing said parts and having a part of substantial thickness which is spaced from the stop block and is adjacent the shaft, and two bolts connecting said stop block to said part of said housing and being respectively disposed on opposite sides of the shaft.

3. A stop device for a rotating shaft, comprising an abutment carried by said shaft, a block disposed in the path of movement of said abutment and having a surface adapted to be engaged thereby, a housing enclosing said parts and having a part spaced from said surface, and bolts connecting said block directly to said spaced part of the housing and extending from said block to said spaced part of the housing in such a direction that engagement of said surface by said abutment produces a direct pull longitudinally of the bolts placing them under tension.

4. In combination, a driving motor, a driven shaft, a second shaft geared to the driven shaft to rotate the same through a limited arc in either direction, clutch means between the motor and the second shaft, and means for stopping rotation of the driven shaft at the completion of its travel through the limited arc in either direction, comprising an abutment carried by the driven shaft, stop means respectively positioned in the paths of movement of the two faces of said abutment, a housing enclosing said shafts, and means separately attaching each of said stop means to said housing and comprising a pair of bolts which are positioned on opposite sides of the second shaft.

5. In combination, a driving motor, a driven shaft, a second shaft geared to the driven shaft to rotate the same through a limited arc in either direction, clutch means between the motor and the second shaft, and means for stopping rotation of the driven shaft at the completion of its travel through the limited arc in either direction, comprising an abutment carried by the driven shaft, stop means respectively positioned in the paths of movement of the two faces of said abutment, a housing enclosing said shafts, and two pairs of bolts respectively attaching said stop means to said housing, the bolts of each pair being positioned on opposite sides of said second shaft.

6. In combination, a driving motor, a driven shaft, a second shaft geared to the driven shaft to rotate the same through a limited arc in either direction, clutch means between the motor and the second shaft, and means for stopping rotation of the driven shaft at the completion of its travel through the limited arc in either direction, comprising an abutment carried by the driven shaft, stop means respectively positioned in the paths of movement of the two faces of said abutment, a housing enclosing said shafts and having a part of greatest thickness adjacent the second shaft, and two pairs of bolts respectively attaching said stop means to said part of the housing, the bolts of each pair being positioned on opposite sides of said second shaft.

VAINO A. HOOVER.

Certificate of Correction

Patent No. 2,397,861.                                           April 2, 1946.

VAINO A. HOOVER

It is hereby certified that error appears in the printed specification of the above numbered patent requiring correction as follows: Page 1, column 1, lines 22 to 24, strike out the words "are useless, as the pressures developed against the stop means" and that the said Letters Patent should be read with this correction therein that the same may conform to the record of the case in the Patent Office.

Signed and sealed this 1st day of October, A. D. 1946.

[SEAL]

LESLIE FRAZER,
*First Assistant Commissioner of Patents.*